Jan. 13, 1970  I M. GUROL  3,489,917
INTERCONNECTED COLLISION SENSING DEVICES WITH A VELOCITY
RESPONSIVE ELECTROMAGNETIC LATCHING MEANS
Filed Sept. 27, 1967

INVENTOR.
I MACIT GUROL
BY
ATTORNEYS

United States Patent Office 3,489,917
Patented Jan. 13, 1970

3,489,917
INTERCONNECTED COLLISION SENSING DEVICES WITH A VELOCITY RESPONSIVE ELECTROMAGNETIC LATCHING MEANS
I. Macit Gurol, Farmington, Mich., assignor to Eaton Yale & Towne Inc., Cleveland, Ohio, a corporation of Ohio
Filed Sept. 27, 1967, Ser. No. 671,021
Int. Cl. H02b 1/24
U.S. Cl. 307—121                                    14 Claims

ABSTRACT OF THE DISCLOSURE

Sensing means adapted for use on a vehicle includes a member movable upon encountering a predetermined rate of change in velocity. A permanent magnet and an electromagnet are positioned on opposite sides of the movable member. One magnet acts to attract the movable member to a normal at rest position while the other magnet is adapted to provide a force acting to attract the movable member to an actuated position with the electromagnet being actuated in response to a condition indicative of a vehicle collision.

---

Figure 1:
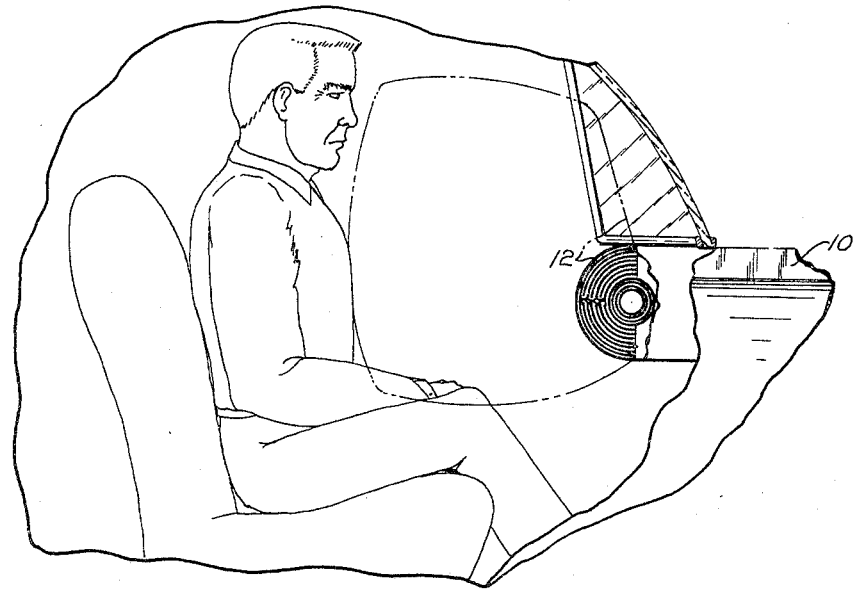

The present invention relates to a sensing apparatus, and more particularly to a sensing apparatus for sensing a vehicle collision in which an occupant should be protected and effecting actuation of a device for restraining movement of the occupant during the crash.

In certain safety systems for occupants of a vehicle, such as an airplane or automobile, an inflatable confinement is expanded under crash conditions to prevent the occupants of the vehicle from being thrown or bounced around during the collision. In such systems, the existence of a collision is sensed by a sensor or sensors which actuate a control element to effect the release of a fluid from a reservoir to effect expansion of the confinement.

One type of collision sensor which is utilized to sense a collision is a device in which a member is moved by inertia relative to its support in response to changes in velocity of the vehicle when the changes occur at a rapid rate as when the automobile is in a collision with an obstruction. If the rate of change of velocity is sufficient, the movable member moves to an actuated position in which parts of the sensing device effect the release of the fluid and the expansion of the conefinement to protect the occupant. Commonly, the movable member actuates switch contacts when it moves to an actuated position to make a circuit to effect the control operation. In this type of sensor, it will be appreciated that the movable member may tend to bounce away from an actuated position or the member may be operated to the actuated position when the vehicle is decelerated rapidly by conditions which would not necessarily result in a collision where the confinement is to be inflated.

An object of the present invention is to provide a new and improved safety system for vehicles in which means for latching a sensing device in an actuated condition is normally ineffective even though the member moves to its actuated position and is rendered effective in response to a condition indicative of a crash or collision.

Another object of the present invention is to provide a new and improved safety system in which a sensing device for sensing a first condition indicative of a collision is adapted to be latched in an actuated position by the operation of latching means which is rendered effective in response to a condition indicative of a crash and preferably in response to a condition normally occurring before the first condition.

A still further object of the present invention is to provide a new and improved crash sensing device in which a member which is moved by its inertia relative to its support to sense a crash is aided in its movement to an actuated position by a force-producing means which is actuated in response to a condition indicative of a crash, preferably the force-producing means is not actuated unless a crash condition is sensed in addition to an acceleration condition.

A still further object of the present invention is to provide a new and improved safety system for protecting the occupants of a vehicle in the event of a collision in which the energization of an electromagnet is changed in response to conditions indicative of a crash to hold a movable member of a crash sensor, which is responsive to the rate of change in velocity, in an actuated position.

It is also an object of the present invention to provide a new and improved collision sensing device in which a movable member of a sensor, responsive to the rate of change in velocity of the vehicle, is aided in its movement to an actuated position for effecting a control operation by an electromagnet whose energization is changed to aid the movement of the movable member as its approaches its actuated position in response to a crash condition normally occurring in advance of movement of the movable member to its actuated position.

It is further an object of the present invention to provide a new and improved sensing device for sensing the rate of velocity change of a vehicle to indicate a condition indicative of a collision in which a member is displaced by its inertia relative to its support as a function of the rate of change in velocity of the vehicle and in which a permanent magnet and an electromagnet are utilized, one of the magnets being utilized to attract the movable member to its normal at rest position and the other of the magnets being utilized to provide a force for facilitating movement of the movable member to its actuated condition and for holding it in its actuated condition as the member approaches the actuated condition, one of the magnets preferably being an electromagnet whose field is changed upon occurrence of a condition indicative of a crash.

Figure 2:
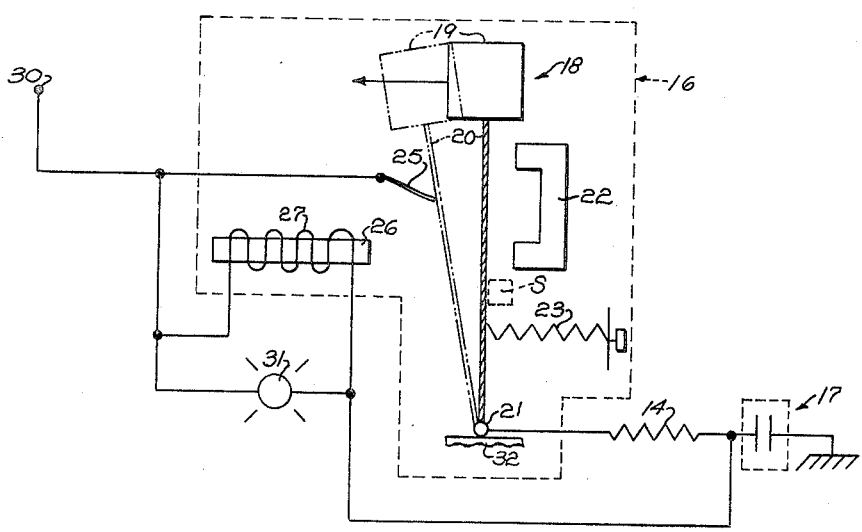

Further objects and advantages of the present invention will be apparent from the following detailed description thereof made with reference to the accompanying drawing forming a part of the present invention and in which:

FIG. 1 is a fragmentary view illustrating a part of a vehicle having a collapsed confinement and an occupant therein; and FIG. 2 is a diagrammatic view of the safety system embodying the present invention.

The novel safety method and apparatus of the present invention can be employed in various types of vehicles, but is particularly susceptible of use in automotive vehicles and airplanes, and for purposes of illustration is herein shown and described as being used in an automobile 10.

As illustrated in FIG. 1, the safety device in the preferred embodiment comprises an inflatable confinement 12 which may be positioned along the dash and which is adapted to be expanded by fluid to the position shown in dot-dash lines to restrain movement of the occupant of the vehicle during a collision to prevent serious injury to the occupant.

The inflatable confinement 12 is expanded by fluid in response to an explosive squib or charge 14 schematically illustrated in FIG. 2. Such squibs effect the release of the fluid from a supply when energized by an electric current. The confinement 12 and the explosive squib or charge 14 for releasing the fluid to inflate the confinement are known to those skilled in the art and therefore shall not be described in detail.

The explosive squib or charge 14 is actuated by passing an electric current therethrough. In the preferred embodiment, sensor devices 16, 17 are connected in series to control the current for actuating the explosive squib or charge 14. The sensor device 16 is the type of sensor which is responsive to the rate of change in velocity of the vehicle. During crash conditions, the vehicle will normally be rapidly decelerated or in the event that the vehicle is at rest and struck by another vehicle rapidly accelerated so that under crash conditions, the vehicle will have a rate of change of velocity which is greater than that normally produced by accelerating or decelerating the automobile under normal conditions. The sensor device 16 comprises a member 18 which comprises a weight 19 which is supported by an arm or rod 20 of magnetic material for movement about a fulcrum 21 on a support 32. The fulcrum 21 is at one end of the arm or rod 20 and the weight 19 is at the other end of the rod. The movable member comprising the weight 19 and the arm or rod 20 is normally held in an at rest position by forces which yieldably oppose movement of the member from its at rest position and tend to return the movable member to its at rest position. In the illustrated sensor device, the forces of a permanent magnet 22 and a spring 23 act on the movable member 18 and are balanced when the movable member is in its normal at rest position and yieldably oppose movement therefrom.

If a change in velocity occurs, the inertia of the movable member 18 will tend to rock it about its fulcrum 21 to move it away from the permanent magnet 22 toward an actuated position shown in dot-dash lines in FIG. 2. If the rate of change of velocity is sufficiently large, the movable member will move to its actuated position. When the movable member is in its actuated position, the arm 20 engages a contact 25 to complete a circuit through the arm 20 to the squib 14 for expanding the confinement 12.

The squib 14, however, will not be energized unless the sensor device 17 also closes contacts which connect the explosive device 14 to ground. The sensor device 17 is preferably a crash sensor which senses the displacement of a part on the vehicle caused by the engagement of the vehicle with a foreign object during the collision. The sensor 17, for example, may be a switch which senses the engagement and displacement of the bumper with a foreign object. Preferably, the sensor 17 in this situation will be actuated prior to the time that the movable member 18 is operated to its actuated position relative to its support in response to the deceleration which will be produced. To this end, the sensor device 17 is disposed to sense the crushing or displacement of a part which will normally take place before the rate of deceleration of the vehicle is sufficient to actuate the movable member 18 to its actuated position.

Since the sensor device 16 and the sensor device 17 are connected in series with the squib 14, it is necessary that both the crash condition and the high rate of deceleration be present before the squib 14 will be actuated to inflate the confinement 12.

In addition to the permanent magnet 22, the sensor 18 shown in the drawing includes an electromagnet 26 which is energized when the sensor device 17 is operated. The electromagnet 26 will operate, when energized, to hold the arm or rod 20 against the contact 25. In addition, the field from the electromagnet 26 will facilitate the movement of the movable member 18 toward its actuated position as the movable member approaches the latter. The field from the electromagnet 26 will act to attract the arm or rod 20 and will facilitate movement of the movable member to the actuated position by changing the net forces tending to return the movable member 18 to its normal at rest position shown in FIG. 2. The attractive force of the electromagnet 26 increases as the movable member moves closer to its actuated position and when the member is in its actuated position overcomes, in the illustrated embodiment, the forces acting on the movable member which tend to return it to its normal at rest position, thereby operating as a latching device. A latching device is desirable in a collision to assure that the movable member 18 does not bounce away from the contact 25 and prevent proper actuation of the squib 14. The electromagnet 26 has an electromagnetic coil 27 which has one side connected to a terminal 30 which is connected to one side of the battery of the vehicle while the other side of the coil 27 is connected to a junction intermediate the squib 14 and the sensor 17, sensor 17 having normally open contacts as indicated in FIG. 2 which connect the electromagnetic coil 27 and the squib 14 to the other side of the power supply which is indicated as ground in the drawing. It will be noted that the system is only a two-wire system and the polarity of the terminal is immaterial. Consequently, the system cannot be misconnected to the battery as long as one wire is connected to one side of battery and other terminal is connected to the other side of the battery.

A fault light 31 is connected across the coil 27 to indicate a short through the sensor 17.

While FIG. 2 illustrates the coil of the electromagnet 26 as being connected to a junction between the squib 14 and the crash switch 17, it will be understood that if the electromagnet coil is to act only as a latching device, the electromagnetic device can be connected across the squib 14. In such an arrangement, both the sensor device 16 and the sensor device 17 would have to be actuated and the electromagnet 26 would function as a latching mechanism to hold the arm 20 against the contact 25.

A resistor may be placed in series with the squib between the contact 25 and the squib 14 to produce a desired voltage drop across the electromagnet when the sensor 16 is actuated.

In another form of the described apparatus, the sensor device 17 may be connected so as to ground only the electromagnet 26 when the device is actuated. In such a system, the squib 14 would be connected directly to ground rather than to ground through the sensor contacts 17. In such a system, a sufficient deceleration or acceleration of the vehicle in the case of a collision to move the movable member 18 against the contact 25 would result in a circuit being made through the squib control element 14 independently of whether or not the sensor device 17 is actuated. If, however, the sensor device 17 is actuated prior to the actuation of the sensor 16 to energize the electromagnet, the sensor 16 will be more sensitive to the rate of velocity change, as well as acting as a latching device.

The sensor device 17 has not been shown or described in detail since it does not, per se, form a part of the present invention and such sensor devices are known to those skilled in the art. One such sensor device is shown in application Ser. No. 653,785, filed by David P. Hass, Hermann Kaiser and Kenneth W. Schang on July 17, 1967 and assigned to the same assignee as the present application.

As stated above, the spring 23 and the magnet 22, in the illustrated embodiment, cooperate to hold the movable member 18 in its normal at rest position shown in FIG. 2. Accordingly, the spring 23 will normally apply a biasing force tending to urge the movable member 18 away from the magnet 22. It will be appreciated that the spring 23 is preferably adjustable to allow adjustment of the force applied by the spring 23. This spring 23 need not necessarily counterbalance the entire force of attraction of the magnet 22 since the rod 20 might be held against a stop S indicated in dotted lines in FIG. 2. In such a sensor, the spring might also act in the same direction as the magnet 22. Preferably, the spring is a relatively light spring.

While a preferred embodiment of the present invention has been described in detail, it is hereby my intention to cover all constructions, modifications and arrangements which fall within the ability of those skilled in the art and the scope and spirit of the present invention.

What is claimed is:

1. Apparatus for use in a vehicle for sensing a collision comprising a first sensor device for sensing certain conditions indicative of a collision, said first sensor device comprising a movable member having a rest position and movable therefrom toward an actuated position upon a rate of change in velocity of said first sensor device, means for yieldably opposing the movement of said movable member to its actuated position by a net force tending to return the member to its rest position, force means actuatable to change the force acting on said movable member to facilitate movement of said movable member to its actuated position, and control means comprising a second sensor device responsive to other conditions indicative of the collision for actuating said force means to facilitate movement of said movable member to its said actuated position, said second sensor device being a collision sensing device for sensing movement of a part of said vehicle displaced by the collision.

2. Apparatus as defined in claim 1 wherein said force means comprises an electromagnet, the energization of which is controlled by said second sensor device.

3. Apparatus as defined in claim 1 wherein said force means produces a force tending to move said movable member toward its actuated position.

4. Apparatus as defined in claim 3 wherein the force of said force means increases as said member approaches an actuated position.

5. Apparatus as defined in claim 4 wherein said force means comprises an electromagnet actuated by said second sensor device.

6. Apparatus as defined in claim 4 wherein said force means is effective to overcome any forces tending to return said movable member when the latter is moved to its actuated position.

7. A safety apparatus for use in a vehicle for sensing a collision comprising a first sensor device for sensing certain conditions indicative of a collision comprising a movable member having a rest position and movable therefrom relative to its support toward an actuated position in response to changes in velocity of the sensor device, means for yieldably opposing the movement of said member to its actuated position by a net force tending to return the member to its rest position, force means actuatable to effect the holding of said member in an actuated position when moved thereto, and control means comprising a second sensor device responsive to other conditions indicative of the collision and normally occurring in advance of said certain conditions for actuating said force means, said second sensor device being a collision device for sensing movement of a part of said vehicle displaced by the collision.

8. A safety apparatus as defined in claim 7 wherein said force means comprises an electromagnet, the energization of which is controlled by said second sensor device.

9. A safety system for sensing the collision of a vehicle and actuating a device for protecting the occupants of a vehicle, said system including a control element for actuating said device and collision sensing means for sensing the collision and for operating said control element to actuate said device, said sensing means comprising a first sensor on the vehicle for sensing a certain condition indicative of a collision and a second sensor on the vehicle for sensing another condition indicative of the collision and normally occurring in advance of said certain condition, means connecting said control element to said sensing means to be controlled by at least said first sensor, force producing means for maintaining said first sensor in an actuated condition when actuated thereto, and means connecting said force producing means to said sensing means to be controlled by at least said second sensor.

10. A safety system as defined in claim 9 wherein said first sensor comprises a movable member moved relative to its support toward an actuated position as a function of the rate of change in velocity of said movable member.

11. A safety system as defined in claim 9 wherein said second sensor is actuated in response to movement of a part on said vehicle displaced by engagement with a foreign object.

12. A safety system as defined in claim 11 wherein said first sensor comprises a movable member moved relative to its support toward an actuated position as a function of the rate of change in velocity of the vehicle.

13. A safety system as defined in claim 9 wherein said first and second sensors are connected in series with said control element.

14. Apparatus for use in a vehicle for sensing a collision comprising a first sensor device for sensing certain conditions indicative of a collision, said first sensor device comprising a movable member having a rest position and movable therefrom toward an actuated position upon a rate of change in velocity of said first sensor device, means for yieldably opposing the movement of said movable member to its actuated position by a net force tending to return the member to its rest position, force means actuatable to change the force acting on said movable member to facilitate movement of said movable member to its actuated position, and control means comprising a second sensor device responsive to other conditions indicative of the collision for actuating said force means to facilitate movement of said movable member to its said actuated position, said second sensor device comprising a collision sensing device for sensing movement of a part of said vehicle displaced by the collision, said part being displaceable to actuate said second sensor device by a force smaller than that necessary to produce a change in velocity at a rate sufficient to operate said first sensor device to an actuated position.

References Cited

UNITED STATES PATENTS

| 2,481,176 | 9/1949 | Taylor et al. | 307—10 |
| 2,888,530 | 5/1959 | Horton | 200—61.45 |
| 3,001,048 | 9/1961 | Rhodes | 335—179 |

FOREIGN PATENTS

| 1,088,597 | 9/1960 | Germany. |

ROBERT K. SCHAEFER, Primary Examiner
R. A. VANDERHYE, Assistant Examiner

U.S. Cl. X.R.

200—61.45; 307—10; 335—179; 340—262